United States Patent
Maloney et al.

(10) Patent No.: US 6,386,642 B2
(45) Date of Patent: May 14, 2002

(54) VEHICLE WHEEL COVER RETENTION SYSTEM

(75) Inventors: Michael V. Maloney, Belleville; Thomas E. Heck, Monroe; James A. Lumm, Whitmore Lake, all of MI (US); James H. Kemmerer, Sweet Springs, MO (US)

(73) Assignee: Haye Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/730,029

(22) Filed: Dec. 5, 2000

Related U.S. Application Data (63) Continuation of application No. 09/473,237, filed on Dec. 27, 1999, which is a continuation of application No. 08/886,264, filed on Jul. 1, 1997, now Pat. No. 6,007,158, which is a continuation of application No. 08/389,867, filed on Feb. 23, 1995, now Pat. No. 5,664,845, which is a continuation-in-part of application No. 08/203,058, filed on Feb. 28, 1994, now Pat. No. 5,435,631.

(51) Int. Cl.$^7$ ................................................. B60B 7/02
(52) U.S. Cl. .................................................... 301/37.43
(58) Field of Search .............................. 301/37.1, 37.28, 301/37.42, 37.43, 108.1

(56) References Cited

U.S. PATENT DOCUMENTS

| | | | |
|---|---|---|---|
| 5,143,426 A | * | 9/1992 | Todd |
| 5,435,631 A | * | 7/1995 | Maloney et al. |
| 5,458,401 A | * | 10/1995 | Baccman |
| 5,597,213 A | * | 1/1997 | Chase |
| 5,664,845 A | * | 9/1997 | Maloney et al. |
| 5,845,973 A | * | 12/1998 | Chase |
| 6,007,158 A | * | 12/1999 | Maloney et al. |
| 6,082,829 A | * | 7/2000 | Chase |

* cited by examiner

*Primary Examiner*—Russell D. Stormer
(74) *Attorney, Agent, or Firm*—MacMillan, Sobanski & Todd, LLC (57) ABSTRACT

A vehicle wheel cover retention system wherein the outboard tire bead seat retaining flange of the associated wheel includes a unique construction for securing a wheel cover to the wheel. In particular, the vehicle wheel includes a disc which defines an outboard facing wheel surface and includes an outboard tire bead seat retaining flange. The outboard tire bead seat retaining flange includes an outer surface having a circumferential, radially inwardly facing groove formed therein. A relatively thin wheel cover (which may or may not conform to the exact contour of the disc) covers at least a portion of the outboard facing wheel disc surface. In particular, the wheel cover includes an outer annular lip which extends into the groove.

28 Claims, 5 Drawing Sheets

VEHICLE WHEEL COVER RETENTION SYSTEM

This application is a continuation of Ser. No. 09/473,737 Dec. 27, 1999 which is a continuation of Ser. No. 08/886,264 Jul. 1, 1997 U.S. Pat. No. 6,007,158 which is a continuation of Ser. No. 08/389,867 Feb. 23, 1995 U.S. Pat. No. 5,664,845 which is a continuation-in-part of Ser. No. 08/203,058 Feb. 28, 1994 U.S. Pat. No. 5,435,631.

BACKGROUND OF THE INVENTION

This invention relates to vehicle wheels and, in particular, to an improved vehicle wheel cover retention system.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive material.

One example of a vehicle wheel construction wherein an ornamental plastic wheel cover having a chrome-plated outer surface is permanently secured to an outboard facing surface of a wheel is disclosed in U.S. Pat. No. 3,669,501 to Derleth. In the Derleth patent, the wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

Another example of a vehicle wheel construction having an ornamental wheel cover permanently secured to an outboard facing surface of the wheel is disclosed in U.S. Pat. No. 5,031,966 to Oakey. In the Oakey patent, a cast aluminum wheel cover is secured to a disc of a steel wheel using a-high density structural adhesive.

SUMMARY OF THE INVENTION

This invention relates to a vehicle wheel cover retention system wherein the outboard tire bead seat retaining flange of the associated wheel includes a unique construction for securing a wheel cover to the wheel.

In particular, the vehicle wheel includes a disc which defines an outboard facing wheel surface and includes an outboard tire bead seat retaining flange. The outboard tire bead seat retaining flange includes an outer surface having a circumferential, radially inwardly facing groove formed therein. A relatively thin wheel cover (which may or may not conform to the exact contour of the disc) covers at least a portion of the outboard facing wheel disc surface. In particular, the wheel cover includes an outer annular lip which extends into the groove. The groove functions, in part, to hide a peripheral edge of the cover. Preferably, an adhesive material is applied to the outboard facing wheel surface of the disc, and the cover is then pressed against the adhesive covered to permanently secure the wheel cover to the disc. Such a construction is especially advantageous when it is desired to produce a "chrome plated" wheel. It has been found that the cost of forming the cover, chrome plating the cover, and then securing it to the disc is substantially less that plating a wheel disc by a conventional process.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
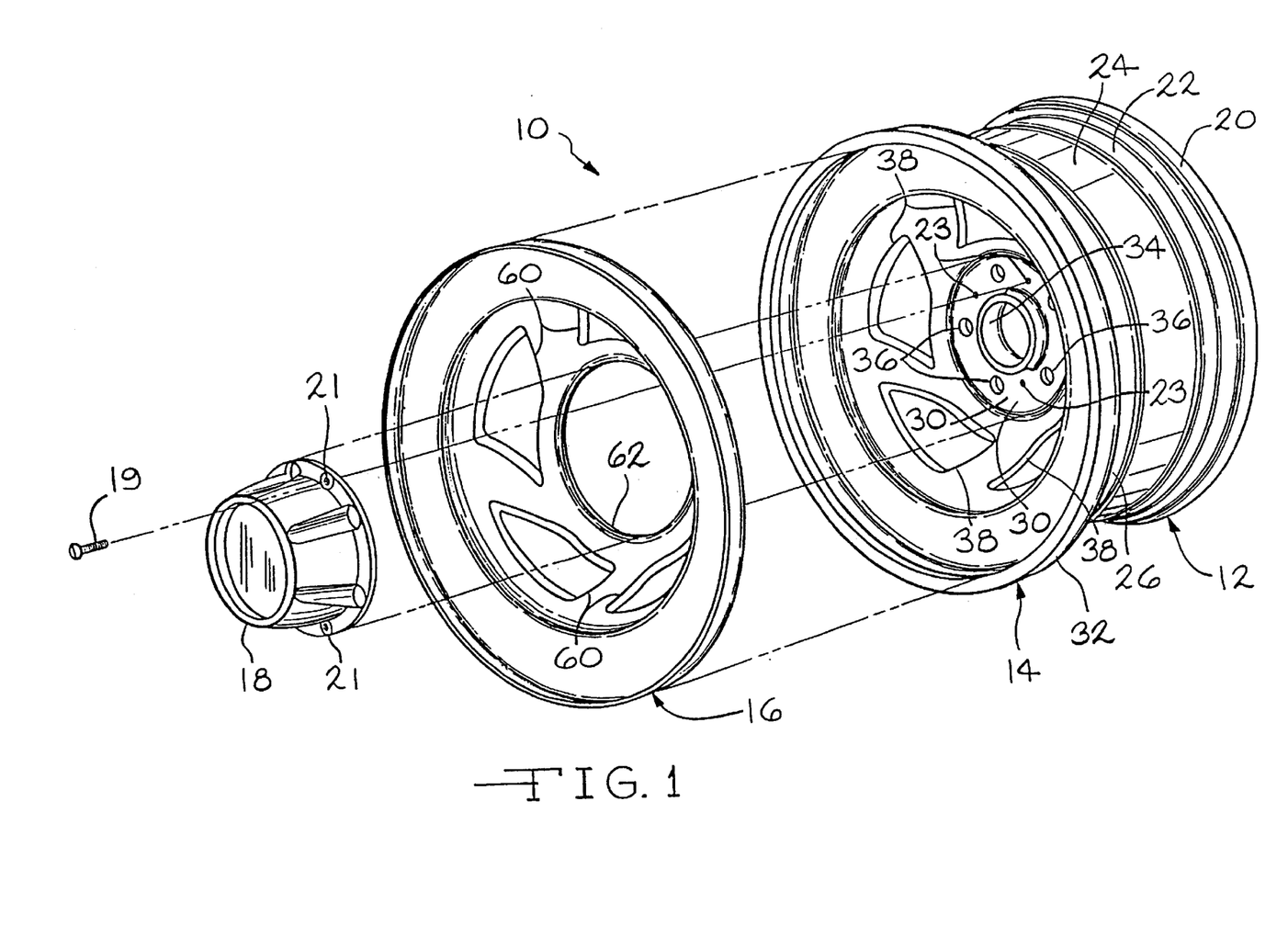
FIG. 1 is an exploded perspective view of an improved vehicle wheel constructed in accordance with the present invention

Referring now to the drawings, there is illustrated in FIG. 1 an exploded perspective view of an improved vehicle wheel, indicated generally at 10, and constructed in accordance with the present invention. The vehicle wheel 10 shown in this embodiment is a full face fabricated type of wheel, and includes a rim 12, a full face wheel disc 14, a wheel cover 16, and a cap 18. However, it will be appreciated that the invention is applicable for used with other wheel constructions. For example, the wheel can be a "bead seat attached wheel" (such as shown in FIG. 4 of U.S. Pat. No. 5,188,429 to Heck et al.), a "well attached wheel" (such as shown in FIG. 3 of U.S. Pat. No. 5,188,429 to Heck et al.), a one-piece cast or forged alloy wheel (such as shown in U.S. Pat. No. 5,078,453 to Siwek), or a wheel construction including a partial rim and a full face wheel disc (such as shown in U.S. Pat. No. 5,027,508 to Cissell II), all of these patents incorporated herein by reference.

The rim 12 is preferably painted black, and is a fabricated rim constructed of steel, aluminum, or other alloy materials. The rim 12 includes an inboard tire bead seat retaining flange 20, an inboard tire bead seat 22, a generally axially extending well 24, and an outboard tire bead seat 26.

The disc 14 is a forged, cast or fabricated disc constructed of steel, aluminum, or other alloy materials, and includes a generally centrally located wheel mounting surface 30, and an outer annular flange 32. The wheel mounting surface 30 is provided with a centrally located pilot aperture 34, and a plurality of lug bolt receiving holes 36. The lug bolt receiving holes 36 receive lug bolts and nuts (not shown) for securing the wheel 10 on an axle (not shown) of a vehicle. The outer annular flange 32 of the disc 14 defines an outboard tire bead seat retaining flange of the wheel 10, and includes an outer surface 40 and an inner surface 42. The disc 14 further includes a plurality of decorative openings or windows 38. Preferably, the annular flange 32 is painted silver and the rest of the disc 14 is painted black.

As shown in this embodiment, the cap 18 is secured to the disc 14 by a plurality of fasteners 19 (only one fastener 19 being illustrated). The fasteners 19 extend through openings 21 formed in the cap, and are received in threaded openings 23 provided in the wheel mounting surface 30 of the disc 14.

Figure 3:
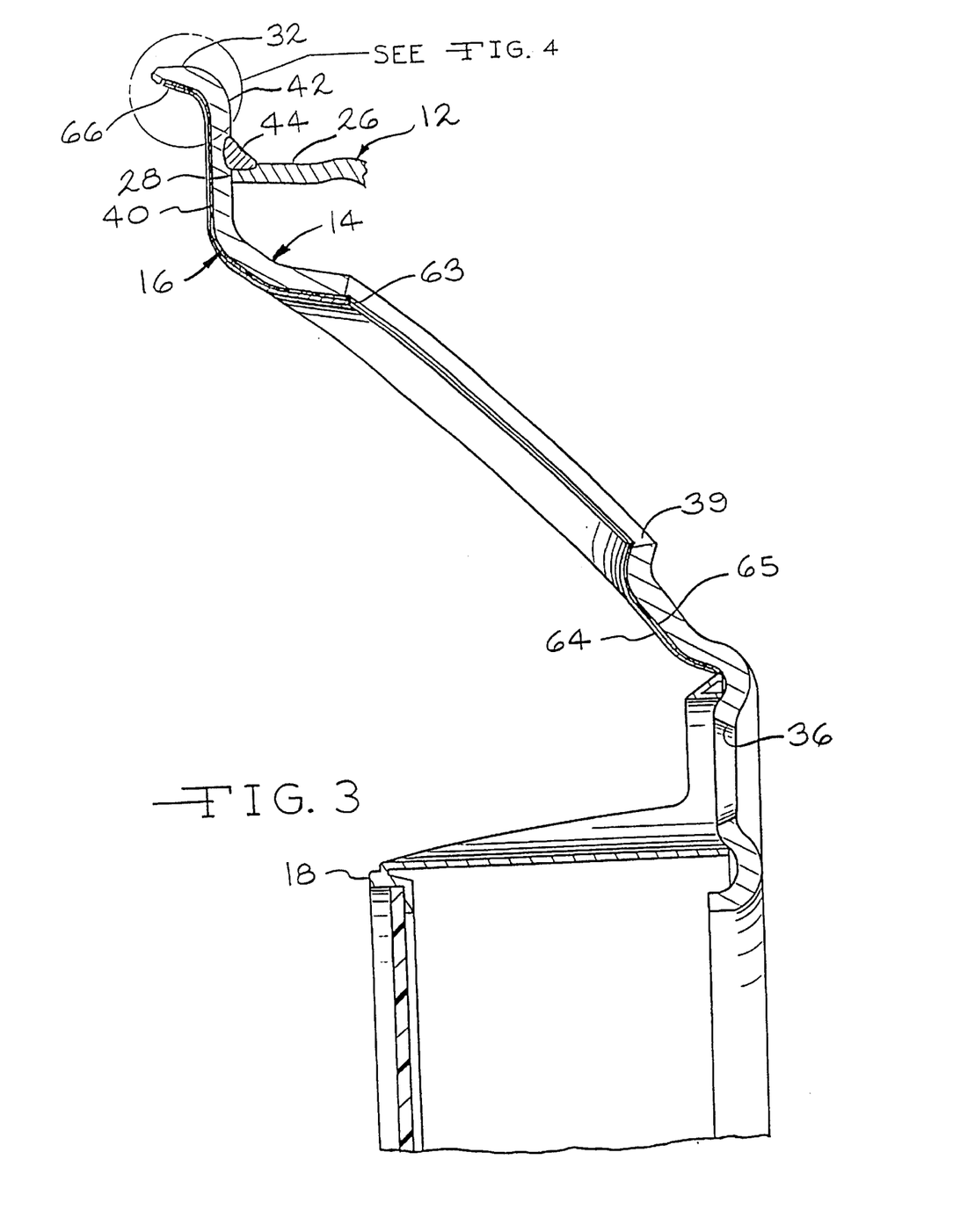
FIG. 3 is a cross-sectional view of a selected portion of the vehicle wheel illustrated in FIG. 1.
Figure 4:
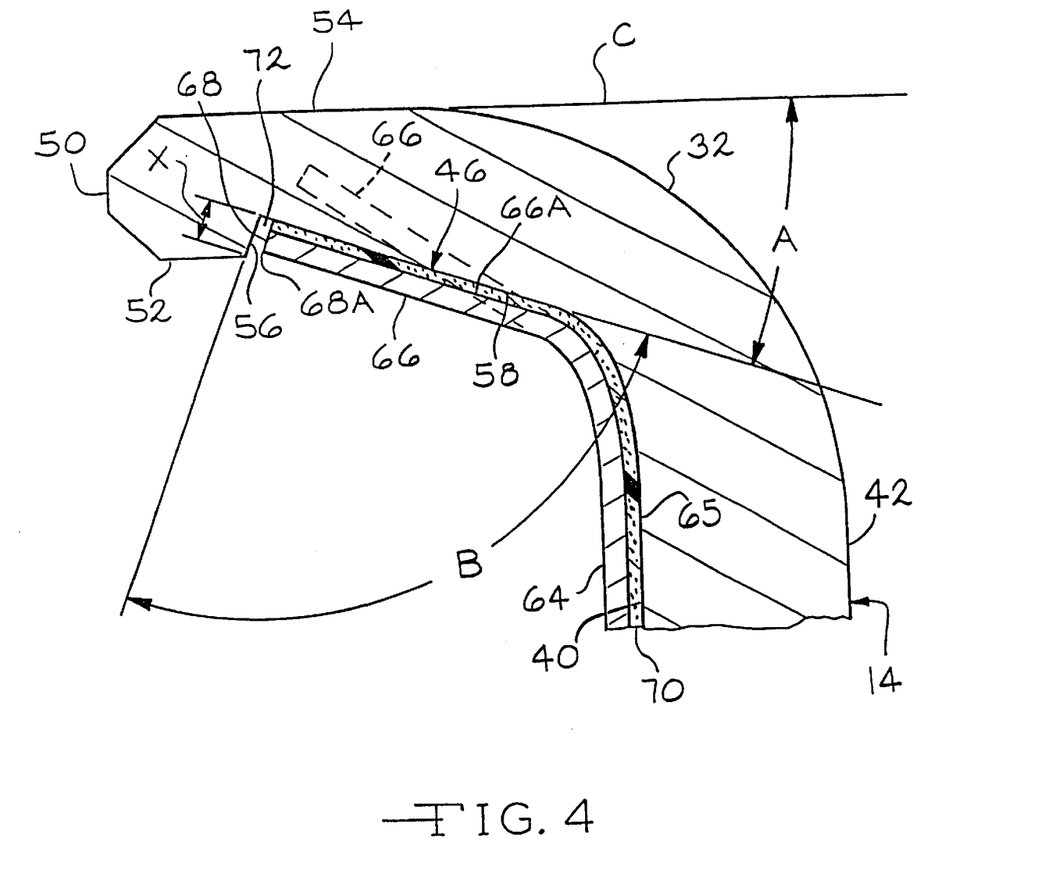
FIG. 4 is an enlarged cross-sectional view of a selected portion of the vehicle wheel illustrated in FIG. 3

As best shown in FIG. 4, the annular flange 32 of the disc 14 defines a radially extending outer end surface 50, an axially extending inner side surface 52, and an axially extending outer side surface 54. To assemble the wheel 10, an outboard end 28 of the rim 12 is positioned against the inner surface 42 of the disc 14 and a weld 44 is provided to join the disc 14 and rim 12 together as shown in FIG. 3.

In accordance with the present invention, the outer surface 40 of the disc 14 is provided with a circumferential, radially inwardly facing groove or recess 46. Preferably, the groove 46 is formed by a machining operation to predetermined specifications. However, the groove 46 can be formed by other methods. For example, the groove 46 can be formed by a stamping operation or a spinning operation.

As best shown in FIG. 4, the groove 46 is defined by a first surface 58 which extends in a generally axial direction, and a second surface 56 which extends in a generally radial direction a predetermined distance X. In particular, the surfaces, 58, and 56 are oriented at predetermined angles A and B, respectively, relative to a reference line C which is generally parallel to the wheel axis. The angle A is in the range of 0° to 30°, and the angle B is in the range of 60° to 120°. Preferably, the angle A is approximately 20°, and the angle B is approximately 90°. As will be discussed below, the distance X is selected so that an outer annular lip of the wheel cover 16 is completely recessed within the groove 46.

The wheel cover 16 shown in this embodiment is preferably formed from stainless steel having a thickness of approximately 0.020 inch, and is painted or chrome plated. The wheel cover 16 is prefabricated to generally match the particular configuration of the outboard facing surface of the disc 14. In particular, the wheel cover 16 includes a plurality of openings 60 which correspond to the windows 38 formed in the disc 14, and an enlarged central opening 62.

The openings 60 in the cover 16 are preferably formed by a stamping operation. As best shown in FIG. 3, edges 63 of the openings 60 extend slightly past edges 39 of the windows 38. As a result of this, when the cover 16 is secured to the disc 14, the completely assembled wheel 10 of the present invention has the appearance of a "chrome plated" wheel.

The cover 16 further defines an outer surface 64, an inner surface 65, and an outer annular lip 65. The annular lip 66 of the cover 16 defines an outer peripheral edge 68 which is preferably slightly spaced from the adjacent second surface 56 of the groove 46 to form a gap 72 therebetween to accommodate small dimensional changes in the outer edge 68 of the wheel cover 16; however, in some instances, there may be some contact between the outer edge 68 of the cover 16 and the second surface 56 of the groove 46. Also, the outer annular lip 66 of the cover 16 is prefabricated in such a manner (as shown in phantom in FIG. 4) that, when the cover 16 is positioned on the disc 14, inner surface 66A of the lip 66 is biased outwardly against surface 58 of the groove 46. The outer peripheral edge 68 of the cover 16 defines an inner circle 68A.

Figure 2:
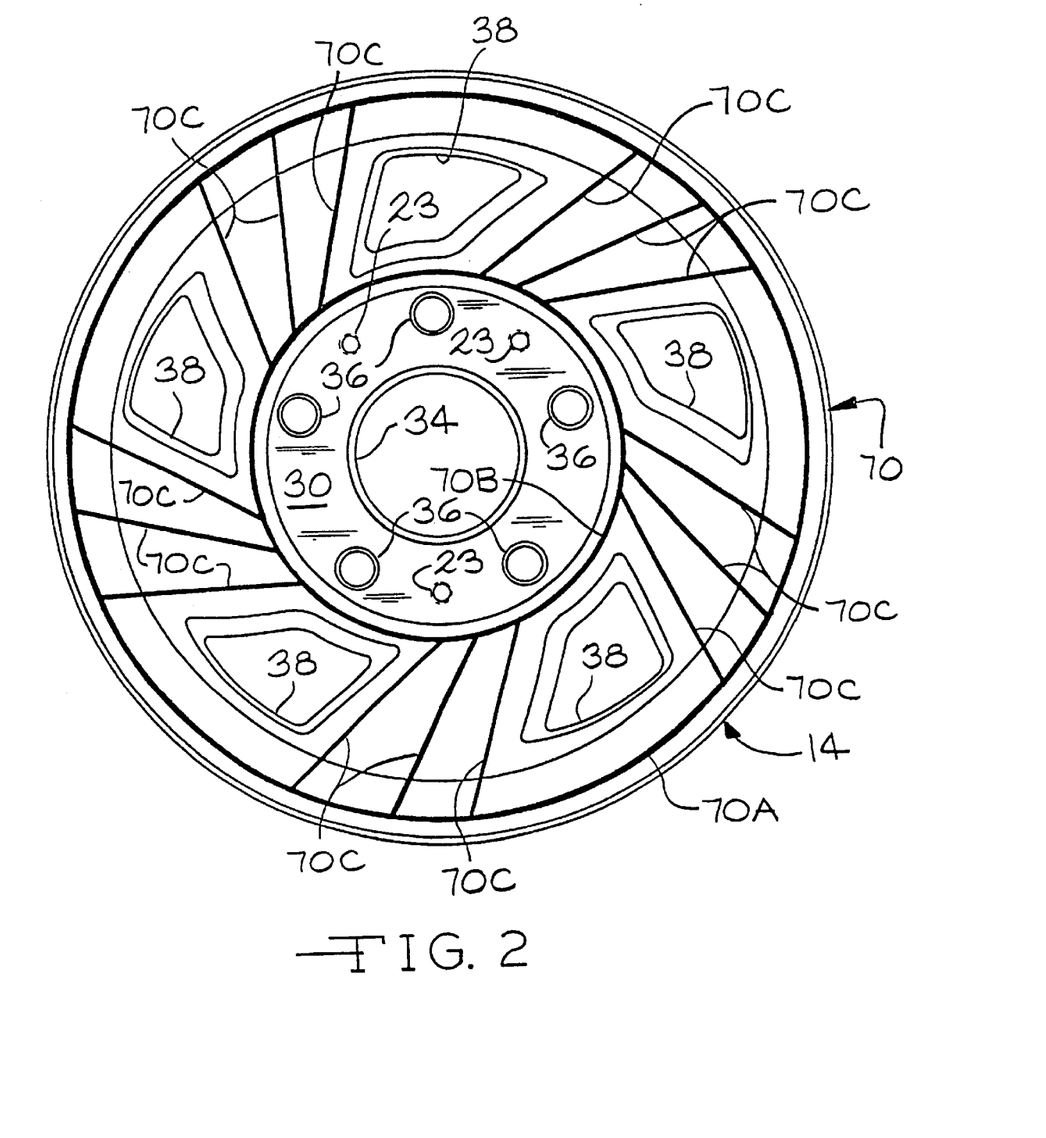
FIG. 2 is a plan view showing the adhesive pattern for the vehicle wheel illustrated in FIG. 1.

In order to permanently secure the cover 16 to the disc 14, an adhesive 70, such as a two-part epoxy, is utilized. A suitable epoxy is FUSOR 380/382 manufactured by Lord Corporation. As shown in FIG. 2, the adhesive 70 is preferably applied on the outboard face of the disc 14 in a predetermined pattern as represented by the heavy lines consisting of an inner circle 70B, an outer circle 70A, and angled radial lines 70C.

The pattern of the adhesive 70 is selected so that when the wheel cover 16 is positioned on the disc 14 and pressure applied thereto, a smearing of the adhesive 70 over substantially the entire outboard face of the disc 14 occurs. The adhesive 70 functions to permanently secure the cover 16 to the disc 14. Also, since the adhesive 70 covers substantially the entire interface between the cover 16 and the disc 14, it is effective to provide a seal and prevent water, mud, and other debris from entering between the cover 16 and the outboard facing surface of the disc 14.

The distance X of the second surface 56 of the groove 46 is at least equal to the combined thicknesses of the wheel cover 16 and the adhesive material so that the inner circle 68A of the wheel cover 16 is recessed relative to the inner side surface 52 of the annular flange 32 of the disc 14. This effectively hides the outer peripheral edge 68 of the cover 16. This is also important to ensure that the wheel cover 16 does not interfere with the attachment of a wheel balance weight 90 (as shown in FIG. 5)

Figure 5:
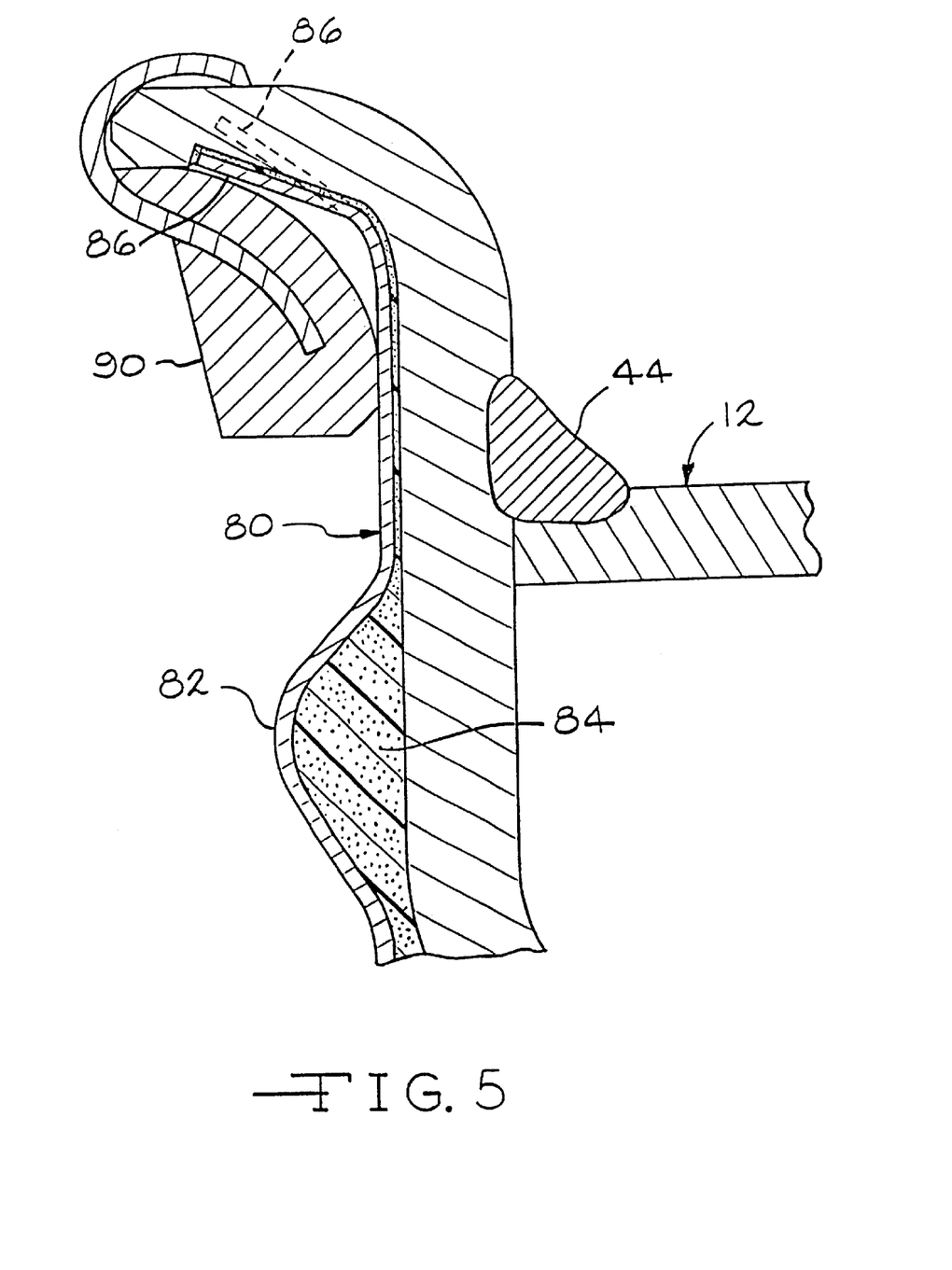
FIG. 5 is a cross-sectional view similar to FIG. 3, and showing an alternate embodiment of a vehicle wheel construction.

FIG. 5 illustrates an alternate embodiment of a wheel cover 80 which is similar to the wheel cover 16 shown in FIGS. 1 and 3, except that the wheel cover 80 has a styled configuration different from the associated wheel disc. This enhances the styling of the associated vehicle wheel as compared to the disc. It also enables different styled covers to be used with a common disc.

In particular, the wheel cover 80 includes a predetermined profile which positions an inner surface 82 thereof a substantial distance from the outboard facing surface of the disc 14. In this embodiment, an expandable foam adhesive material 84 is used to permanently secure the cover 80 to the disc 14. Preferably, the adhesive material 84 is applied to the outer surface of the disc 14 in a predetermined pattern so that when the adhesive material 84 expands, it covers substantially the entire interface between the cover 80 and the disc 14. The adhesive material 84 functions to permanently secure the cover 80 to the disc 14, and prevents water, mud, and other debris from entering therebetween.

Also, the cover 80 includes an outer annular lip 86 which is prefabricated and secured in a manner similar to that discussed above with respect to the cover 14 of FIGS. 1–4.

It will be appreciated that while the invention has been illustrated and described as having the wheel cover cover only a portion of the outboard facing surface of the disc, other wheel cover configurations are possible. For example, a wheel cover (not shown) can be provided to cover substantially the entire outboard facing surface of the disc.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed is:

1. A method for securing a wheel cover to a vehicle wheel comprising the steps of:
   (a) providing a vehicle wheel including an outboard tire bead seat retaining flange and a wheel disc, the retaining flange and the wheel disc cooperating to define an outboard surface of the vehicle wheel, the wheel disc having a plurality of windows formed therein;
   (b) providing a wheel cover having an outer surface and an inner surface, the wheel cover having a styled configuration including selected portions which do not closely follow the contour of the vehicle wheel outboard surface, the wheel cover having a plurality of decorative openings formed therein, at least some of the decorative openings formed in the wheel cover defining an edge;
   (c) positioning the wheel cover and the vehicle wheel relative to one another so that the selected portions of the wheel cover inner surface are spaced apart from the vehicle wheel outboard surface and the edge of the wheel cover decorative openings extends slightly past an adjacent edge of the wheel disc windows to effectively overlap the edge of the windows; and (d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

2. The method according to claim 1 wherein at least some of the decorative openings formed in the wheel cover corresponding to the windows formed in the wheel disc.

3. The method according to claim 1 wherein the wheel cover includes an outer peripheral portion which covers only a portion of the retaining flange.

4. The method according to claim 3 wherein the wheel cover outer peripheral portion which covers only a portion of the retaining flange generally follows the contour of the vehicle wheel outboard surface.

5. The method according to claim 3 wherein the uncovered portion of the retaining flange is painted silver.

6. The method according to claim 1 wherein the wheel cover includes an inner peripheral portion which extends toward but does not cover a plurality of lug bolt holes formed in the wheel disc.

7. The method according to claim 1 wherein the expandable foam adhesive covers substantially an entire interface between the wheel cover inner surface and the vehicle wheel outboard surface.

8. The method according to claim 1 wherein the wheel cover includes an outer peripheral portion which is attached to the retaining flange of the vehicle wheel by a mechanical lock.

9. The method according to claim 1 wherein the vehicle wheel is constructed from steel.

10. The method according to claim 1 wherein the vehicle wheel is constructed from aluminum.

11. The method according to claim 1 wherein the wheel cover outer surface is chrome plated.

12. The method according to claim 1 wherein the vehicle wheel includes a wheel rim and a wheel disc which are joined together by a weld.

13. A method for securing a wheel cover to a vehicle wheel comprising the steps of:

(a) providing a vehicle wheel including an outboard tire bead seat retaining flange and a wheel disc, the retaining flange and the wheel disc cooperating to define an outboard surface of the vehicle wheel, the wheel disc having a plurality of windows formed therein;

(b) providing a wheel cover having an outer surface and an inner surface, the wheel cover having a styled configuration including selected portions which do not closely follow the contour of the vehicle wheel outboard surface, the wheel cover having a plurality of decorative openings formed therein, at least some of the decorative openings formed in the wheel cover defining an edge, the wheel cover including an outer peripheral portion which covers only a portion of the retaining flange and an inner peripheral portion which extends toward but does not cover a plurality of lug bolt holes formed in the wheel disc, the wheel cover outer peripheral portion which covers only a portion of the retaining flange generally following the contour of the vehicle wheel outboard surface;

(c) positioning the wheel cover and the vehicle wheel relative to one another so that the selected portions of the wheel cover inner surface are spaced apart from the vehicle wheel outboard surface and the edge of the wheel cover decorative openings extends slightly past the adjacent edge of the wheel disc windows which extends slightly past an adjacent edge of the windows to effectively overlap the edge of the windows; and (d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

14. The method according to claim 13 wherein at least some of the decorative openings formed in the wheel cover corresponding to the windows formed in the wheel disc.

15. The method according to claim 13 wherein the uncovered portion of the retaining flange is painted silver.

16. The method according to claim 13 wherein the expandable foam adhesive covers substantially an entire interface between the wheel cover inner surface and the vehicle wheel outboard surface.

17. The method according to claim 13 wherein the wheel cover includes an outer peripheral portion which is attached to the retaining flange by a mechanical lock.

18. The method according to claim 13 wherein the vehicle wheel is constructed from steel.

19. The method according to claim 13 wherein the vehicle wheel is constructed from aluminum.

20. The method according to claim 13 wherein the wheel cover outer surface is chrome plated.

21. The method according to claim 13 wherein the vehicle wheel includes a wheel rim and a wheel disc which are joined together by a weld.

22. A method for securing a wheel cover to a vehicle wheel comprising the steps of:

(a) providing a vehicle wheel including a wheel rim and a wheel disc joined together by a weld, the vehicle wheel including an outboard tire bead seat retaining flange which cooperates with the wheel disc to define an outboard surface of the vehicle wheel, the wheel disc having a plurality of windows formed therein;

(b) providing a wheel cover having a chrome plated outer surface and an inner surface, the wheel cover having a styled configuration including selected portions which do not closely follow the contour of the vehicle wheel outboard surface, the wheel cover having a plurality of decorative openings formed therein, at least some of the decorative openings formed in the wheel cover corresponding to the windows formed in the wheel disc and defining an edge, the wheel cover including an outer peripheral portion which covers only a portion of the retaining flange and an inner peripheral portion which extends toward but does not cover a plurality of lug bolt holes formed in the wheel disc, the wheel cover outer peripheral portion which covers only a portion of the retaining flange generally following the contour of the vehicle wheel outboard surface;

(c) positioning the wheel cover and the vehicle wheel relative to one another so that the selected portions of the wheel cover inner surface are spaced apart from the vehicle wheel outboard surface and the edge of the wheel cover decorative openings extends slightly past the adjacent edge of the wheel disc windows to effectively overlap the edge of the windows;

(d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

23. The method according to claim 22 wherein at least some of the decorative openings formed in the wheel cover corresponding to the windows formed in the wheel disc.

24. The method according to claim 22 wherein the uncovered portion of the retaining flange is painted silver.

25. The method according to claim 22 wherein the expandable foam adhesive covers substantially an entire interface between the wheel cover inner surface and the vehicle wheel outboard surface.

26. The method according to claim 22 wherein the wheel cover includes an outer peripheral portion which is attached to the retaining flange by a mechanical lock.

27. The method according to claim 22 wherein the vehicle wheel is constructed from steel.

28. The method according to claim 22 wherein the vehicle wheel is constructed from aluminum.

* * * * *

US006386642C1

(12) INTER PARTES REEXAMINATION CERTIFICATE (809th)
United States Patent
Maloney et al.

(10) Number: US 6,386,642 C1
(45) Certificate Issued: Jan. 28, 2014

(54) VEHICLE WHEEL COVER RETENTION SYSTEM

(75) Inventors: Michael V. Maloney, Belleville, MI (US); Thomas E. Heck, Monroe, MI (US); James A. Lumm, Whitmore Lake, MI (US); James H. Kemmerer, Sweet Springs, MO (US)

(73) Assignees: HLI Operating Company, Inc., Northville, MI (US); Hayes Lemmerz International, Inc., Northville, MI (US); HLI Suspension Holding Company, LLC, Northville, MI (US)

Reexamination Request:
  No. 95/000,018, May 30, 2003

Reexamination Certificate for:
  Patent No.: 6,386,642
  Issued: May 14, 2002
  Appl. No.: 09/730,029
  Filed: Dec. 5, 2000

Related U.S. Application Data

(63) Continuation of application No. 09/473,237, filed on Dec. 27, 1999, now Pat. No. 6,286,908, which is a continuation of application No. 08/886,264, filed on Jul. 1, 1997, now Pat. No. 6,007,158, which is a continuation of application No. 08/389,867, filed on Feb. 23, 1995, now Pat. No. 5,664,845, which is a continuation-in-part of application No. 08/203,058, filed on Feb. 28, 1994, now Pat. No. 5,435,631.

(51) Int. Cl.
    *B60B 7/02* (2006.01)

(52) U.S. Cl.
    USPC .......................................... 301/37.43

(58) Field of Classification Search
    None
    See application file for complete search history.

(56) References Cited

To view the complete listing of prior art documents cited during the proceeding for Reexamination Control Number 95/000,018, please refer to the USPTO's public Patent Application Information Retrieval (PAIR) system under the Display References tab.

*Primary Examiner* — Beverly M. Flanagan (57) ABSTRACT

A vehicle wheel cover retention system wherein the outboard tire bead seat retaining flange of the associated wheel includes a unique construction for securing a wheel cover to the wheel. In particular, the vehicle wheel includes a disc which defines an outboard facing wheel surface and includes an outboard tire bead seat retaining flange. The outboard tire bead seat retaining flange includes an outer surface having a circumferential, radially inwardly facing groove formed therein. A relatively thin wheel cover (which may or may not conform to the exact contour of the disc) covers at least a portion of the outboard facing wheel disc surface. In particular, the wheel cover includes an outer annular lip which extends into the groove.

FIG. 5
AMENDED

US 6,386,642 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWINGS FIGURE HAVE BEEN CHANGED AS FOLLOWS:

The lead line for reference numeral 82 has been redirected.

AS A RESULT OF REEXAMINATION, IT HAS BEEN DETERMINED THAT:

Claims 1, 13 and 22 are determined to be patentable as amended.

Claims 2-12, 14-21 and 23-28, dependent on an amended claim, are determined to be patentable.

1. A method for securing a wheel cover to a vehicle wheel comprising the steps of:
  (a) providing a vehicle wheel including an outboard tire bead seat retaining flange and a wheel disc, the retaining flange and the wheel disc cooperating to define an outboard surface of the vehicle wheel, the wheel disc having a plurality of windows formed therein;
  (b) providing a *prefabricated* wheel cover having an outer surface and an inner surface, the wheel cover having a styled configuration including selected portions *of the wheel cover inner surface* which do not closely follow the contour of the vehicle wheel outboard surface, the wheel cover having a plurality of decorative openings formed therein, at least some of the decorative openings formed in the wheel cover defining an edge;
  (c) *subsequent to steps (a) and (b),* positioning the wheel cover and the vehicle wheel relative to one another so that the selected portions of the wheel cover inner surface are spaced apart from the vehicle wheel outboard surface and the edge of the wheel cover decorative openings extends slightly past an adjacent edge of the wheel disc windows to effectively overlap the edge of the windows; and
  (d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

13. A method for securing a wheel cover to a vehicle wheel comprising the steps of:
  (a) providing a vehicle wheel including an outboard tire bead seat retaining flange and a wheel disc, the retaining flange and the wheel disc cooperating to define an outboard surface of the vehicle wheel, the wheel disc having a plurality of windows formed therein;
  (b) providing a *prefabricated* wheel cover having an outer surface and an inner surface, the wheel cover having a styled configuration including selected portions *of the wheel cover inner surface* which do not closely follow the contour of the vehicle wheel outboard surface, the wheel cover having a plurality of decorative openings formed therein, at least some of the decorative openings formed in the wheel cover defining an edge, the wheel cover including an outer peripheral portion which covers only a portion of the retaining flange and an inner peripheral portion which extends toward but does not cover a plurality of lug bolt holes formed in the wheel disc, the wheel cover outer peripheral portion which covers only a portion of the retaining flange generally following the contour of the vehicle wheel outboard surface;
  (c) *subsequent to steps (a) and (b),* positioning the wheel cover and the vehicle wheel relative to one another so that the selected portions of the wheel cover inner surface are spaced apart from the vehicle wheel outboard surface and the edge of the wheel cover decorative openings extends slightly past the adjacent edge of the wheel disc windows which extends slightly past an adjacent edge of the windows to effectively overlap the edge of the windows; and
  (d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

22. A method for securing a wheel cover to a vehicle wheel comprising the steps of:
  (a) providing a vehicle wheel including a wheel rim and a wheel disc joined together by a weld, the vehicle wheel including an outboard tire bead seat retaining flange which cooperates with the wheel disc to define an outboard surface of the vehicle wheel, the wheel disc having a plurality of windows formed therein;
  (b) providing a *prefabricated* wheel cover having a chrome plated outer surface and an inner surface, the wheel cover having a styled configuration including selected portions *of the wheel cover inner surface* which do not closely follow the contour of the vehicle wheel outboard surface, the wheel cover having a plurality of decorative openings formed therein, at least some of the decorative openings formed in the wheel cover corresponding to the windows formed in the wheel disc and defining an edge, the wheel cover including an outer peripheral portion which covers only a portion of the retaining flange and an inner peripheral portion which extends toward but does not cover a plurality of lug bolt holes formed in the wheel disc, the wheel cover outer peripheral portion which covers only a portion of the retaining flange generally following the contour of the vehicle wheel outboard surface;
  (c) *subsequent to steps (a) and (b),* positioning the wheel cover and the vehicle wheel relative to one another so that the selected portions of the wheel cover inner surface are spaced apart from the vehicle wheel outboard surface and the edge of the wheel cover decorative openings extends slightly past the adjacent edge of the wheel disc windows to effectively overlap the edge of the windows;
  (d) permanently securing the wheel cover to the vehicle wheel by using an expandable foam adhesive which is applied at least between the spaced apart surfaces of the selected portions of the wheel cover inner surface and the vehicle wheel outboard surface for contact therewith to thereby enable the expandable foam adhesive to secure the wheel cover to the vehicle wheel.

* * * * *